United States Patent [19]

Ryan

[11] Patent Number: 4,509,873

[45] Date of Patent: Apr. 9, 1985

[54] ALPHANUMERIC SECTION OF OFFICE MACHINE KEYBOARDS

[76] Inventor: W. Kenneth Ryan, c/o William F. Ryan, 3303 Lakeview, Cincinnati, Ohio 45211

[21] Appl. No.: 491,752

[22] Filed: May 5, 1983

[51] Int. Cl.³ .............................................. B41J 5/08
[52] U.S. Cl. ..................................... 400/489; 400/82; 400/88; 400/472; 400/682; 340/365 R; D18/1
[58] Field of Search ................... 400/82, 88, 472, 488, 400/489, 682; 84/423, 446, 447; 178/17 C; 200/5 A; 235/145 R; 248/166, 460; 269/65, 324, 325; 340/365 R, 365 S, 365 E; 434/227, 231; D17/1-9; D18/1, 7

[56] References Cited

U.S. PATENT DOCUMENTS

| 546,235 | 9/1895 | Luther | 296/325ᵃ |
|---|---|---|---|
| 3,879,602 | 4/1975 | Walker | 200/5 A |
| 3,926,422 | 12/1975 | Wilson | 269/60 |
| 3,940,758 | 2/1976 | Margolin | 200/5 A |
| 3,990,565 | 11/1976 | Felton et al. | 400/682 |
| 4,120,039 | 10/1978 | Fischer | 200/5 A |
| 4,378,553 | 3/1983 | McCall | 400/82 |

FOREIGN PATENT DOCUMENTS

| 56-118120 | 9/1981 | Japan | 340/365 R |
|---|---|---|---|
| 8300308 | 2/1983 | PCT Int'l. Appl. | 400/682 |

OTHER PUBLICATIONS

"Wallet Terminal Keyboard with Acoustic Coupler"; M. F. Davis, Jr. et al., *IBM Technical Disclosure Bulletin;* vol. 10, No. 3, pp. 188-189; Aug. 1967.

*Primary Examiner*—Clifford D. Crowder
*Assistant Examiner*—David A. Wiecking

[57] ABSTRACT

An adjustable alphanumeric keyboard based on ISO standard format and consisting of two flat key contact mounting boards, one left and one right, corresponding respectively to the section of the alphanumeric keyboard actuated by the left hand and right hand in touch typing, joined by a hinge at a point corresponding to the keyboard C row, between columns 05 and 06, the outermost end of one mounting board connected by a hinge to the keyboard case or chassis, the outermost end of the other mounting board free to move laterally and pivot in the same plane, with means available to position said movable end, in order to give the mounting boards an adjustable angle, peaking the rows of key contacts between columns 05 and 06.

1 Claim, 7 Drawing Figures

FIG. 5
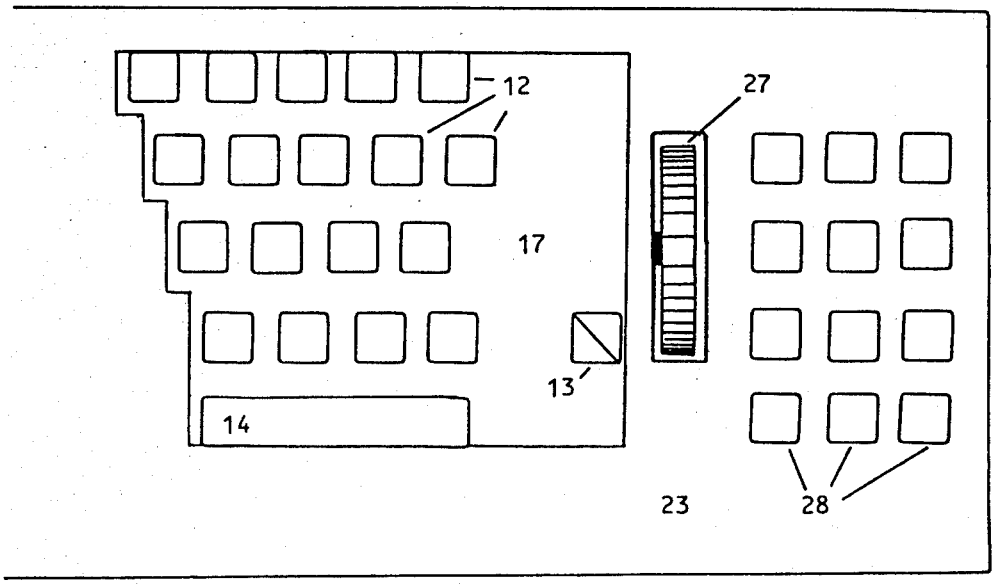
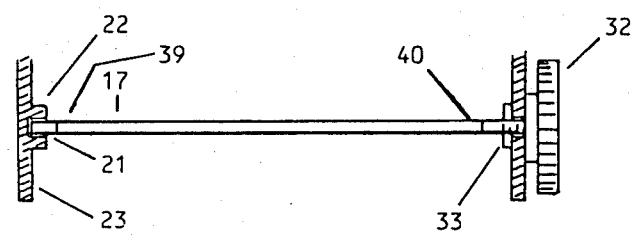
FIG. 6

ALPHANUMERIC SECTION OF OFFICE MACHINE KEYBOARDS

BRIEF SUMMARY OF THE INVENTION

The invention is an adjustable keyboard for typewriters, terminals and similar machines, utilizing right and left mounting boards holding respectively the sets of keys generally used by the right hand and the left hand in touch typing. The right and left mounting boards are joined to each other at a central point by a hinge, the outer end of the first mounting board being fixed with a hinge to the keyboard chassis or case, the outer end of the second mounting board being free to movable laterally within the chassis or case. A means is provided to adjust the lateral movement of the movable end of said second mounting board.

The objective of the invention is to allow adjustment of the two sides of the standardized keyboard from/to a flat horizontal position to/from a position in which the mounting boards form an angle (<180°) to each other, raised at their junction point, their outer ends maintained in their original plane, each flat row of keys peaked between the keys normally activated by the right and left hands, respectively, in touch typing. The adjustability makes ergonomic improvement over the standard flat keyboard possible, while permitting retention of the standardized form when and as desired by the user.

Improvements offered by this invention over the art include rapid, simultaneous adjustment of the keyboard halves, facilitated replication of a desired adjustment, facilitated overview of the keyboard in adjusted form and a physical construction that is both economical to manufacture and mechanically stable regardless of adjustment.

BRIEF DESCRIPTION OF THE DRAWINGS

FIG. 5 Shows part of a keyboard construction with mounting board 17 fitted with a plurality of key contacts 12, 13, and space bar 14, arranged according to ISO standard. Knob 27 is shown partially protruding through the top surface of keyboard case 23. The keyboard is shown fitted with an additional set of function key contacts 28.

FIG. 6 Shows an end section view of mounting board 17 with extension 21 engaged in slot 22 of the keyboard chassis or case 23. When a hinged rider as shown in FIG. 4 is used, both front edge 39 and rear edge 40 of the mounting board would be equipped as shown in the left hand portion of FIG. 6. One means of both providing movement and maintaining a desired adjustment of the keyboard is shown in the right hand portion of the figure in which a threaded continuation 33 of one board extension protrudes through a lateral slot in the keyboard chassis or case and is fitted with a threaded knob.

DETAILED DESCRIPTION OF THE INVENTION

Background of the Invention

Figure 1:
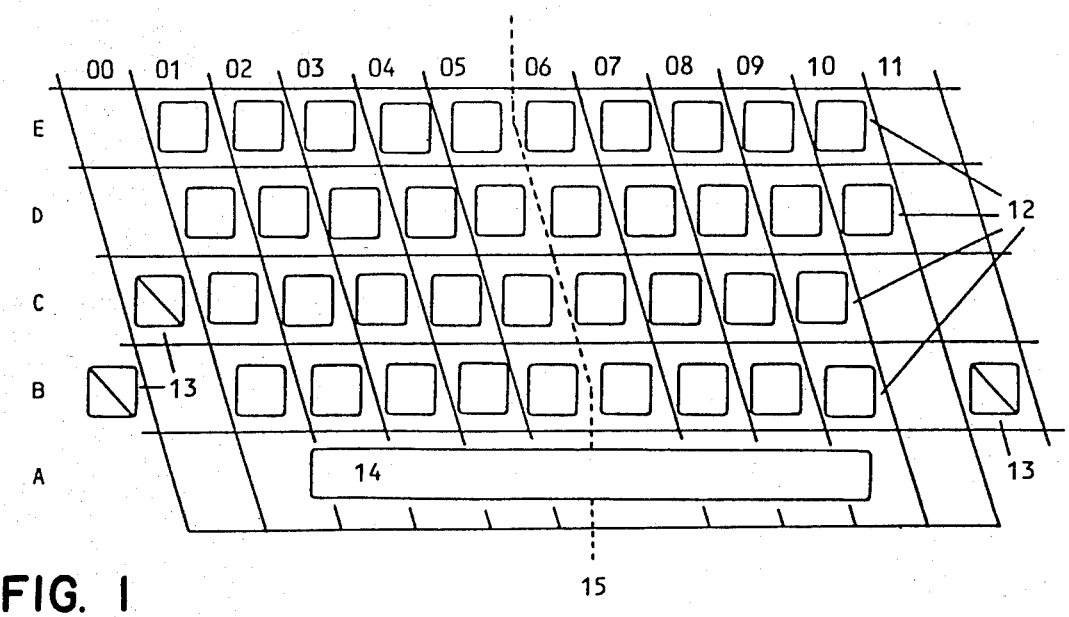
FIG. 1 Shows the ISO standardized keyboard layout for office machines, the basic arrangement for the alphanumeric section of keyboards operated with both hands, showing key rows A through E, column positions 00 through 11, key contacts for alphanumeric keys 12, shift keys 13 and space bar 14. Dashed line 15 shows the division between key sets actuated by the right hand and left hand, respectively in touch typing.

The normal alphanumeric keyboard for electric typewriters, computer terminals and similar office machines consists of four straight horizontal rows of keys, with a fifth "row" dedicated to the space bar. The rows are designated A (for the space bar) through E (for the top, or digits, row) by the International Organization for Standardization (ISO). The "vertical" columns of keys, which are actually canted approximately 20° from the vertical, are designated 99, 00, 01, ... 15 by ISO. Letters and numerals are generally located in vertical columns 01 through 10 (exceptions for some foreign languages and special symbols). In practice the rows are often justified right and left by the use of elongated function keys for eg. tabulation and character shift.

The columns of keys on a keyboard are normally sloped upward away from the user, each row from A to E being stepped a certain amount (usually 6° to 15°). This stepping is generally constant from one row to the next although it may be slightly greater in row E, the digit row. The adjustment entailed by this invention will interrupt the horizontal flatness of the key rows, while maintaining the original degree of stepping within each column of keys. Therefore, in this description, the term flat keyboard will be understood to include representation of the vertical offset within the columns as though it described a flat surface.

In touch typing, a division (15) is made between the keys operated by the left hand and the right hand. The break is traditionally located between vertical columns 05 and 06.

The use of a flat keyboard allows the user to see the letter and symbol designations normally printed on the keytops. In touch typing it is assumed that manipulation of the keys is by "touch", rather than sight. Those who do not touch type are aided by having a full view of the keytops, as provided by the standardized flat-row keyboard construction. Among those who touch type, and can be assumed to use an alphanumeric keyboard often and/or for long periods, the flat-row design can be suspected of leading to certain physical discomforts, fatigue and, perhaps, injury.

In order to type, the keyboard user is forced to work with hands in a position that borders on what is physically possible. The hands are brought before the body and the palms are turned downward, approximately parallel to the floor. This causes pronation (crossing) of the bones in the lower arm. Since this is difficult, the keyboard user may be forced to raise his/her elbows away from the body. This reduces the pronation in the lower arm, but can lead to static load on muscles in the shoulder region. Wrist, arm, elbow and shoulder pains among keyboard users are a recognized medical problem.

The easiest manner to avoid these problems is to slope the right and left hand sides of the keyboard, as has been suggested in an early United States Patent. However, the angle between the keyboard sides in the suggested solution could not be adjusted by the user, nor could the keyboard be returned to a position with flat horizontal rows of keys. More recent work by Kroemer has resulted in an ergonomically advanced keyboard design that deviates entirely from ISO standards and requires the user to learn a new system of touch typing.

A U.S. Pat. No. 3,990,565 issued to Fulton et al. describes a keyboard comprising two disjointed halves, each connected at its outer end to an arm. Each half must be individually adjusted by the typist. No means of maintaining an adjusted position is presented. No means of equalizing adjustment is presented. The design lacks mechanical stability. The spread of the keyboard halves occasioned by adjustment makes keyboard overview more difficult. This is particularly important for the growing number of keyboard users (eg. computer users) who would wish the advantages of an ergonomically improved keyboard, but who are not trained typists and thus must rely on the sight of the keyboard for accurate system input.

Several hinged, folding keyboards have been presented. In each case the objective has been to reduce the surface area of the keyboard when not in use.

The intent and purpose of my invention is to allow adjustment of the generally accepted, ISO standardized alphanumeric keyboard for typewriters, terminals and similar devices generally referred to (no matter where used) as "office machines". In "adjusted" position with the key rows broken and peaked at the 05-06 column positions, the keyboard will reduce lower arm pronation, thus reducing both short and long term user fatigue, and should thereby lead both to faster typing and a reduction of errors. It should also simplify the learning of touch typing (by adding an additional height dimension to the keyboard) which in turn would lead to greater use of the ergonomic advantages of the design.

The problems inherent in Fulton et al. are overcome by the present improvement in that adjustment of the keyboard halves is both simultaneous and equal, and can be effected with one hand. Replication of a desired adjustment is simplified. Means of providing and maintaining desired adjustment are provided, and user overview is facilitated rather than being made more difficult. The construction, in which each end of each keyboard half is mechanically connected to another structural element, provides greater mechanical integrity and stability to the entire keyboard unit which, despite the numerous advantages mentioned, should be less difficult and more economical to manufacture.

The invention is realized as follows:

The keyboard consists of electrical or optical key contacts (12) mounted on two mounting boards (16, 17). The front to rear cross section of these boards may be flat, stepped, or dished.

Figure 2:
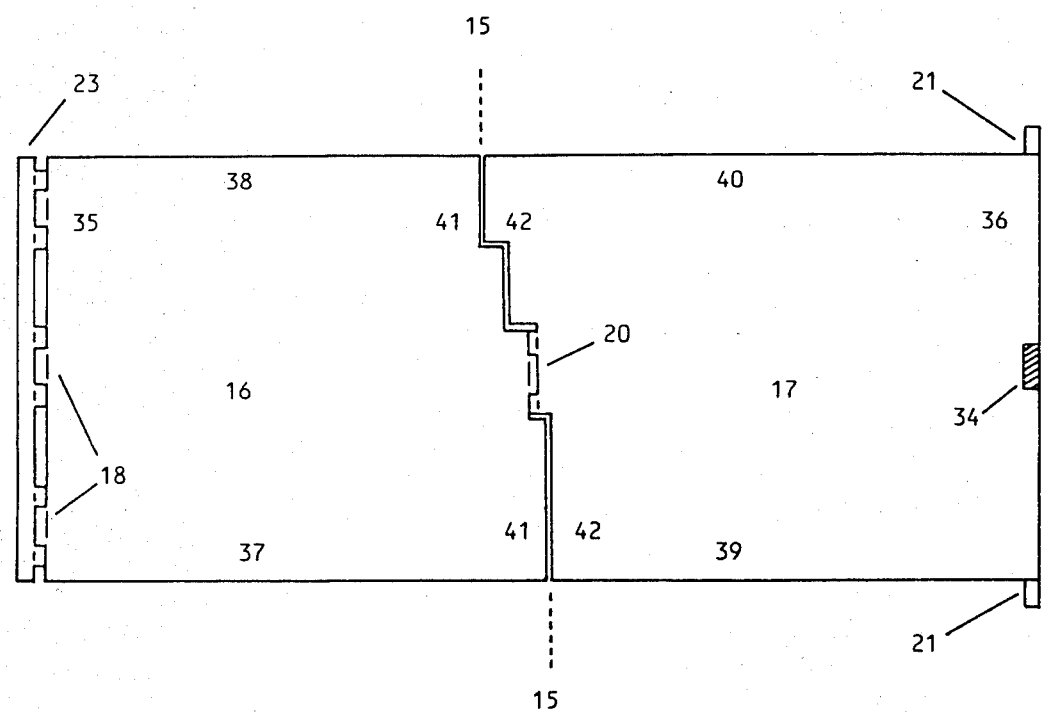
FIG. 2 Shows the left mounting board 16 and the right mounting board 17. A hinge 18 connects one mounting board to the keyboard chassis or case 23. A hinge 20 is located between the adjacent edges 41, 42 of the left and right mounting boards, respectively, in a position corresponding to the position of the keyboard C row and approximately half way between the outermost edges 35, 36 of the respective mounting boards, connecting mounting boards 16 and 17. The division 15 between the mounting boards corresponds to the division between key sets actuated by the left and right hands in touch typing. Board extensions 21 engage in slots 22 in the keyboard chassis or case as shown in FIG. 6. A suitable position 34 is indicated for the attachment of hinged rider 25 as shown in FIG. 4, when that means of adjustment is selected.

The mounting boards, one left (16) and one right (17), correspond to the single mounting board usually used in typewriters, terminals and the like for mounting the key contacts, and are separated along a line (15) corresponding to the division between ISO designated key columns 05 and 06. This separation can be stepped instead of straight (FIG. 2), to accomodate the shape of the key contacts. The two mounting boards thus holds the keys (contacts) generally actuated by the left and right hands, respectively, in touch typing. The E row of the mounting boards could be so formed that the key in row E, column 06, and generally coded with digit 6, which would normally belong to the right mounting board, could be included on the left mounting board instead.

The mounting boards are joined by a hinge (20). The location of the hinge would normally be between the key positions in columns 05 and 06 in row C, the home row in touch typing. The location of the hinge (20) is approximately equidistant from the outermost ends (35,36) of the two mounting boards.

The outer end (35,36) of one of the mounting boards (the first, 16 or 17 respectively) is fixed with a hinge (18) to the chassis or external case of the keyboard, so that it may pivot vertically around this mounting point.

The outer end (36,35) of the other (the second, 17 or 16 respectively) mounting board is free to slide laterally within the chassis or case of the keyboard in the same plane as the hinged outer end of the first mounting board. It is, at the same time, free to pivot around the point of lateral movement. This can be accomplished with eg. pin-in-slot (21, 22) extensions of the mounting board.

When this jointed construction of first and second mounting boards is fully extended, the hinged center of the construction can be held in the same plane as as the outer ends by, eg. resting on a portion of the chassis or case provided for this purpose.

The lateral position of the outer end of the second mounting board can be adjusted by means of an extension through the front or back of the keyboard case (23), and held in selected position by a screw-down clamp, (32,33) or by a prong or pawl engaging teeth or slots in the case, etc.

It can alternately be located by a knob (27) on an threaded axle (26) protruding through one short end of the case, the knob end of the axle held in position by a collar and the other end of the axle engaging a thread in a hinged rider (25) on the sliding outer end of the second mounting board. Part of the knob could alternately protrude through the upper surface of the keyboard case if, eg. additional function keys (28) were wished added to the keyboard outside the alphanumeric area intended for adjustment.

Numerous alternative methods of laterally locating the sliding end of the second mounting board can also be imagined, such as the application of torque to a position on either of the mounting boards. The means of lateral adjustment is secondary in this case to the fact and type of keyboard adjustability, and other means of adjustment than those described must be considered to conform with the concept of the invention.

When the sliding end of the second mounting board is moved laterally from its outermost position by eg. turning the knob (27) on the threaded axle (26) engaged in the rider (25), the center of the mounting board construction rises, thus allowing use of the keyboard with palms turned inward according to the degree of adjustment. The keyrow angle is adjustable from flat (180°) to an angle (<180°) determined by the desire of the user and the innermost extent of the means of adjustment.

Figure 3:
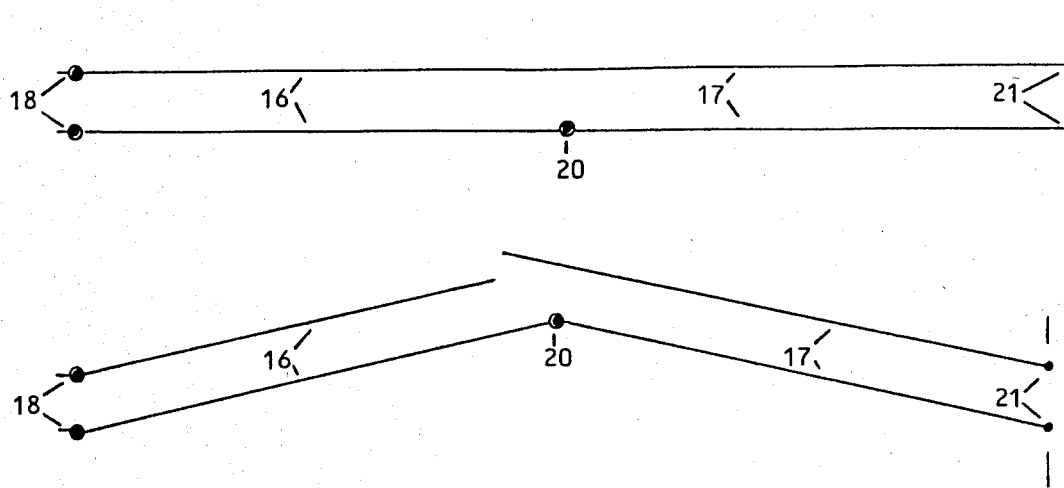
FIG. 3 Shows two diagramatic horizontal section views through mounting boards 16, 17 at the E and C key rows. The upper portion of the figure shows the boards flat, with hinges 18 at one end and hinge 20 connecting the boards in the C row. The lower portion of the figure shows the same parts when pressure has been applied to the board end that is free to move laterally, represented here by extension positions 21.
Figure 4:
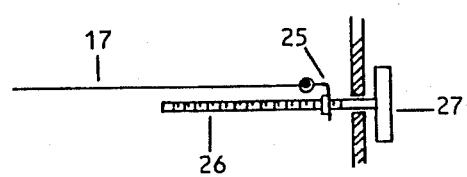
FIG. 4 Shows a diagramatic horizontal section through part of mounting board 17, a hinged rider 25 with a threaded hole through which a threaded axle 26 is fitted. The axle protrudes through keyboard case 23 and is fitted with a knob 27.
Figure 7:
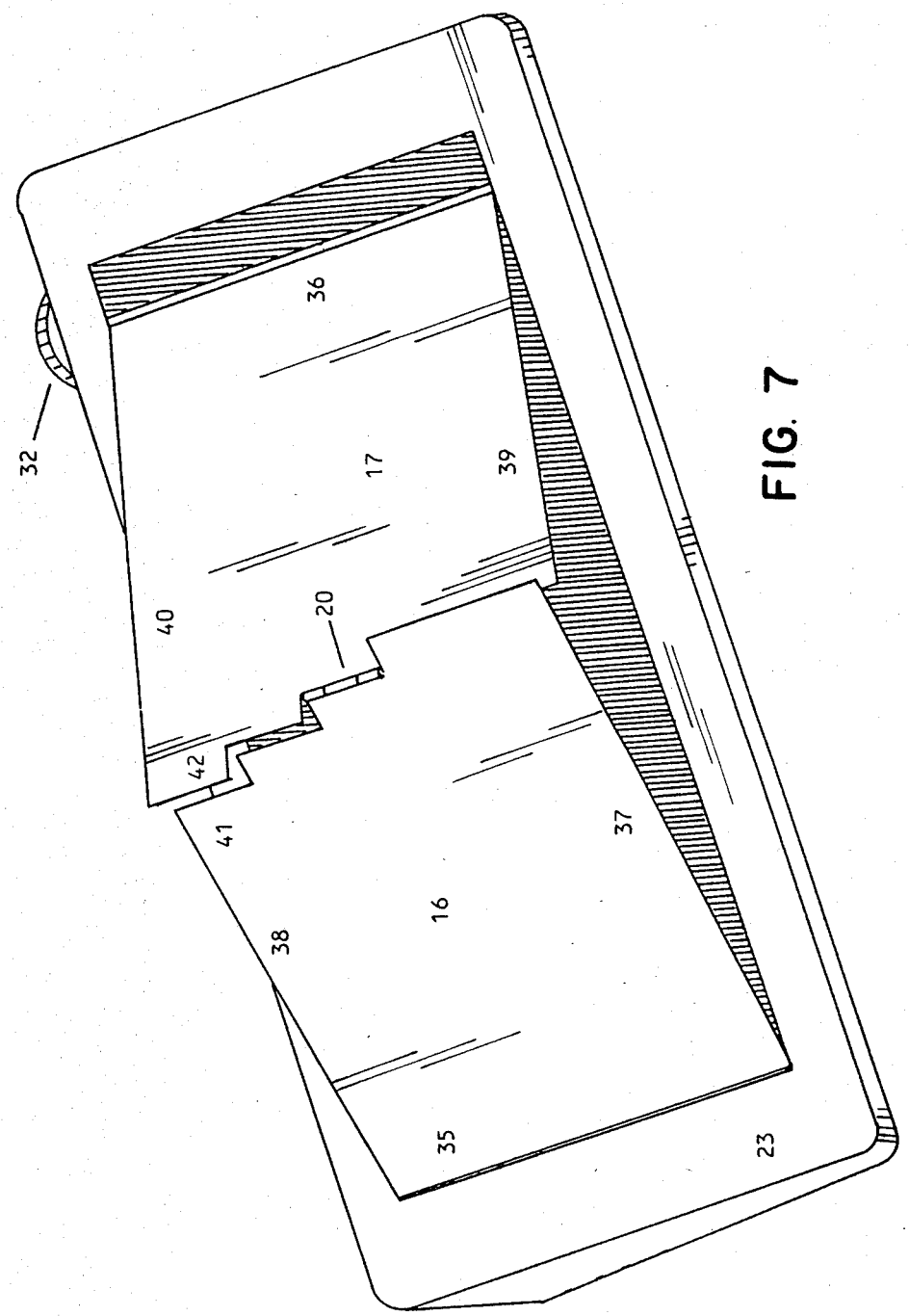
FIG. 7 Shows a perspective view of the keyboard in upwardly adjusted form corresponding to the lower portion of FIG. 3. Keys and key contact positions have been omitted from the mounting boards 16,17 in order to show the location of central hinge 20 and the position of the boards relative to each other when upwardly adjusted. Mounting boards 16, 17 have been mounted in a keyboard case 23 and an adjustment knob 32 is shown mounted in a manner corresponding to that shown in FIG. 6. The central hinge 20 is approximately equidistant from the outermost ends 35, 36 of the left and right mounting boards 16 and 17, respectively. It is also approximately equidistant from the front edges 37, 39 and rear edges 38, 40 respectively of left and right mounting boards 16, 17.

Since the length of key rows actuated by left and right hands is unequal, due to the cant of the "vertical" column division, there will be a slight inequality in the amount of rise (FIG. 3) of adjacent keys in columns 05 and 06 except at the point of hinging, which is in the home row (ISO row C).

Since the direction of pressure on the key tops is vertical to the position of the mounting boards, and since a touch typist is trained not to cross the line of division between right hand and left hand key groupings, this slight inequality of rise presents no problem. For the keyboard user who has not been trained, it encourages proper typing habits.

This invention presupposes the division of the space bar (14), and thus the use of two key contacts for its operation, so that it too will be adjustable to the same plane as the key rows. However, since it is often actuated by the thumb, which has a rotational ability not possessed by the fingers, it may be possible to maintain the space bar in its traditional, unadjustable form.

Since the central hinge (20) is approximately equidistant from the mounting board outer ends (35,36) the upward adjustment of the keyboard center allows equal rotation inward from the horizontal of the hands of the keyboard user (palms at an angle <180°). Since both mounting boards are joined centrally, their adjustment is simultaneous and can be effected by adjusting one end of one mounting board. Since each end of each mounting board is joined to another structural element, and the structure is triangulated (two mounting boards plus the keyboard chassis or case) the structure is mechanically rigid. Since the horizontal projection of the keyboard is shortened during adjustment, the field of view is made narrower, permitting easier overview.

I claim:

1. In a keyboard for typewriters, terminals and similar machines in which keys are arranged in general accord with International Organization for Standards recommendations for the alphanumeric sections of keyboards for office machines, an improvement comprising:

one left mounting board and one right mounting board, said mounting boards having front and rear edges, the mounting boards together having adjacent ends and outermost ends, and together corresponding to a standard keyboard, and said left and right mounting boards so shaped that they can be fitted with key contacts and keys as actuated by the left and right hands, respectively, in touch typing;

a hinge between and connecting said left mounting board and right mounting board, said hinge in a position approximately equidistant from the outermost ends of said mounting boards and likewise approximately equidistant from the front and rear edges of said mounting boards, said hinge permitting the adjacent edges of said mounting boards to be raised vertically at said hinge mounting position;

a second hinge connecting the outermost end of one of the said mounting boards to the keyboard chassis or case;

a means of locating the outermost end of the other said mounting board, permitting both lateral and pivotal movement;

a means of maintaining the lateral position of the mounting board outermost end that is permitted lateral and pivotal movement.

* * * * *